United States Patent
Guo et al.

(10) Patent No.: US 11,070,370 B2
(45) Date of Patent: Jul. 20, 2021

(54) PHASE AND POLARIZATION MULTI-DEGREE-OF-FREEDOM MODULATED QKD NETWORK SYSTEM AND METHOD

(71) Applicant: SOUTH CHINA NORMAL UNIVERSITY, Guangdong (CN)

(72) Inventors: Banghong Guo, Guangdong (CN); Min Hu, Guangdong (CN); Panpan Zhang, Guangdong (CN)

(73) Assignee: SOUTH CHINA NORMAL UNIVERSITY, Guangzhou (CN)

( * ) Notice: Subject to any disclaimer, the term of this patent is extended or adjusted under 35 U.S.C. 154(b) by 408 days.

(21) Appl. No.: 16/314,858

(22) PCT Filed: Dec. 20, 2017

(86) PCT No.: PCT/CN2017/117394
§ 371 (c)(1),
(2) Date: Jan. 2, 2019

(87) PCT Pub. No.: WO2018/130052
PCT Pub. Date: Jul. 19, 2018

(65) Prior Publication Data
US 2019/0312723 A1    Oct. 10, 2019

(30) Foreign Application Priority Data
Jan. 16, 2017    (CN) .......................... 201710028864.8

(51) Int. Cl.
*H04B 10/00*    (2013.01)
*H04L 9/08*    (2006.01)
(Continued)

(52) U.S. Cl.
CPC ........ *H04L 9/0858* (2013.01); *H04J 14/0212* (2013.01); *H04L 9/0852* (2013.01)

(58) Field of Classification Search
CPC ....................................................... H04B 10/70
See application file for complete search history.

(56) References Cited

U.S. PATENT DOCUMENTS

2020/0044835 A1* 2/2020 Legre ................ H04B 10/07953
2020/0099520 A1* 3/2020 Legre .................... H04L 9/0852

FOREIGN PATENT DOCUMENTS

CN            1721917 A       1/2006
CN          104579564 A       4/2015

\* cited by examiner

*Primary Examiner* — Daniel G Dobson (57) ABSTRACT

A system includes an Alice transmitting terminal, a wavelength division multiplexing (WDM) unit and a plurality of Bob terminals for receiving a plurality of photons of different wavelengths; the Alice terminal is connected with the plurality of Bob terminals by the WDM unit; the Alice terminal includes a multi-wavelength laser generation device, an attenuator, a first polarization beam splitter, a first beam combiner, a phase modulator, a first polarization controller and a second polarization controller; the WDM unit includes a wavelength selection device; each Bob terminal includes a second polarization controller, a third polarization controller, a fourth polarization controller, a third polarization beam splitter, a fourth polarization beam splitter, a second beam combiner, a third beam combiner, a first photon detector, a second photon detector, a third photon detector and a fourth photon detector.

17 Claims, 4 Drawing Sheets

(51) Int. Cl.
*H04J 14/02* (2006.01)
*H04J 14/00* (2006.01)

PHASE AND POLARIZATION MULTI-DEGREE-OF-FREEDOM MODULATED QKD NETWORK SYSTEM AND METHOD

TECHNICAL FIELD

The present invention relates to the technical field of quantum secure communication and optical fiber communication and specifically relates to a phase and polarization multi-degree-of-freedom modulated QKD network system and a key distribution method.

BACKGROUND

At present, quantum signal modulation commonly adopts single-degree-of-freedom modulation such as polarization, phase, frequency and intensity. The polarization modulation of an optical signal refers to information loading realized by regulating the polarization of light. Generally, two linear polarization states of a photon are adopted for encoding, the polarization states of the photon are easily affected by factors such as stress birefringence and polarization mode dispersion in an optical fiber and the interference of the environment in a transmission process, and therefore, polarization compensation or other methods capable of guaranteeing the polarization stability are generally required. Phase modulation refers to information encoding using phase shifting of light. In principle, the phase modulation of quantum communication is mainly based on a Mach-Zehnder interferometer, and a phase modulator is used as a core device. The firstly-proposed phase modulation scheme is based on a single M-Z interferometer with two symmetric arms. Due to environment influences, the length difference of two arms may be instable, the phase difference may also drift, thus, the interference effect may be seriously affected, and the interference effect is poorer particularly for relatively-long distance transmission. Later, people propose a double M-Z interference system with two asymmetric arms, the time disturbance on an overlaid part of the optical fiber has the same influences on the two pulses, and therefore, the interference stability is greatly improved. However, the small change of arm length may also result in the reduction of interference contrast ratio even if a double asymmetric M-Z interferometer is used.

An M-Z interferometer QKD system is generally used with the BB84 protocol and the B92 protocol, and the safety of the system is based on the condition that Eve cannot exactly know a base by which a legitimate communication party encodes and detects information. On the other hand, the system adopting the BB84 protocol and the B92 protocol is not high in protocol efficiency, low in code generation rate and incapable of meeting actual application demands due to the requirement for comparing an encoding base with a measuring base when a code is finally formed. Differential phase encoding inherits the advantages of high encoding speed, strong anti-interference ability and extremely long transmission distance of a phase encoding scheme, is suitable for being realized in an optical fiber circuit and capable of greatly increasing the code generation efficiency. Information is carried by virtue of a difference of two pulses including a prepulse and an afterpulse in differential phase encoding, and the pulses may undergo the same phase and polarization changes in the optical fiber and are insensitive to various interferences in the optical fiber, and as a result, the stability of the system is improved.

Encoder and Decoder for Quantum in Phase Modulation Polarization State and Application Thereof published by Zhilie Tang et al in 2006 proposed a novel phase modulation and polarization encoding quantum key distribution method which has relatively high stability, however, the utilization ratio of a quantum secret communication photon of a six-state quantum encoder and decoder is low. Four-State Quantum Encoder and Decoder Realizing Polarization Encoding by Phase Modulation as well as Quantum Key Distribution System published by Jindong Wang et al on December 2014 proposed that the phase of a certain linearly polarized light is modulated by the phase modulator, so that a phase difference of two linearly polarized lights is changed, and finally, polarization encoding is realized, namely quanta are transmitted by taking polarization serving as a single degree of freedom as an information carrier. While orbital angular momentum has multiple degrees of freedom realize to realize the encoding of high-dimensional quantum information. However, orbital angular momentum multi-degree-of-freedom modulation is mainly applied to quantum free space communication and classical multichannel high-speed communication.

Based on the current situation of the prior art, it is expected to develop a phase and polarization multi-degree-of-freedom modulated QKD network system to realize one-to-many communication. Moreover, various users are relatively independent of each other, so that the key generation rate of a single user is kept stable and may not be reduced along with increase of the number of users, and furthermore, the safe, stable and efficient transmission of the QKD network system is realized.

SUMMARY

An object of the present invention is to provide a phase and polarization multi-degree-of-freedom modulated QKD network system and method to overcome defects in the prior art. According to the phase and polarization multi-degree-of-freedom modulated QKD network system and method, pulses with all wavelengths are transmitted to different legitimate users by taking multi-wavelength pulses generated by a single-light-source and multi-wavelength laser device as multiuser information transmission carriers, so that one-to-many communication is realized. Moreover, the users are relatively independent of each other, so that the key generation rate of a single user is kept stable and may not be reduced along with the increase of the number of users, and furthermore, the safe, stable and efficient transmission of the QKD network system is realized. In addition, the phase and polarization multi-degree-of-freedom modulated multiuser QKD network system adopts a novel quantum information encoding mode, namely a simultaneous differential phase encoding and polarization encoding mode, so that the bit error rate caused by instability of external conditions may be effectively reduced, the safety and stability of the system may be improved, and the utilization ratio of a photon is increased from 0.5 to 2. An existing differential phase and polarization encoding combined QKD scheme is improved, the generation rate of quantum keys is increased, and the time slot waiting time of each communication is shortened.

The single-light-source and multi-wavelength laser device, an attenuator, a polarization beam splitter, a plurality of beam combiners, a phase modulator and a plurality of polarization controllers are used as multiuser information transmission carriers in the system, wherein one information bit is loaded by virtue of a phase difference of a prepulse and an afterpulse of an upper arm and a lower arm, and meanwhile, another information bit is loaded in a pulse polarization state. The pulses with all the wavelengths are transmitted to the different authorized users by a wavelength division multiplexing unit so as to be subjected to corresponding polarization demodulation and phase demodulation. Various users are relatively independent of each other, so that the key generation rate of a single user is kept stable.

To realize above object, the following technical solution is proposed by current invention: A phase and polarization multi-degree-of-freedom modulated QKD network system comprises an Alice control terminal, a wavelength division multiplexing unit and A plurality of Bob terminals, and the Alice terminal is connected with the plurality of Bob terminals by the wavelength division multiplexing unit.

The Alice terminal comprises a multi-wavelength laser generation device, an attenuator, a first polarization beam splitter, a first beam combiner, a phase modulator, a first polarization controller and a second polarization controller.

The wavelength division multiplexing unit comprises a wavelength selection device.

the plurality of Bob terminals comprises a plurality of Bob terminals for receiving a plurality of photons of different wavelengths, and each Bob terminal comprises a second polarization beam splitter, a third polarization controller, a fourth polarization controller, a third polarization beam splitter, a fourth polarization beam splitter, a second beam combiner, a third beam combiner, a first photon detector, a second photon detector, a third photon detector and a fourth photon detector.

Pulse train with a plurality of wavelengths are generated by the multi-wavelength laser generation device and is then attenuated by the attenuator to form a single-photon pulse, the single-photon pulse is in turn split into a vertically-polarized pulse and a horizontally-polarized pulse by the first polarization beam splitter, and the vertically-polarized pulse and the horizontally-polarized pulse enter the first beam combiner through an upper arm path and a lower arm path respectively so as to be subjected to beam combination; and then, the pulses are randomly modulated for $k\pi$ ($k=0, 1$) phases by the phase modulator to arrive at the first polarization controller and the second polarization controller respectively so as to be subjected to polarization rotation, and finally, the two pulses enter the Bob terminal in the same polarization state.

The multi-wavelength laser pulses of the same polarization are transmitted to a wavelength routing device, the Bob terminal with a corresponding wavelength is selected according to a wavelength addressing mode, polarization demodulation is performed by the second polarization beam splitter of the Bob terminal, and the horizontally-polarized pulse is selected to pass through the third polarization controller when a polarization bit is "0"; and the vertically-polarized pulse is selected to pass through the fourth polarization controller when the polarization bit is "1".

After the pulse is output from the third polarization controller and passes through the third polarization beam splitter, two paths including an upper arm path through which a prepulse is delayed to arrive at the second beam combiner and a lower arm path through which an afterpulse directly arrives at the second beam combiner are formed. Two beams of light on the upper arm path and the lower arm path generate interference at the second beam combiner, and then, the first photon detector and the second photon detector make identification responses according to a randomly-modulated phase difference.

After the pulse is output from the fourth polarization controller and passes through the fourth polarization beam splitter, two paths including an upper arm path and a lower arm path are formed, wherein the upper arm path is the one through which a prepulse is delayed to arrive at the third beam combiner; and the lower arm path is the one through which an afterpulse directly arrives at the third beam combiner, two beams of light on the upper arm path and the lower arm path generate interference at the third beam combiner, and then, the third photon detector and the fourth photon detector make identification responses according to a randomly-modulated phase difference.

Preferably, the upper arm path has a delay T compared with the lower arm path.

Preferably, the first polarization controller performs pulse polarization rotation by $$\frac{n-1}{2}\pi,$$

and the second polarization controller performs pulse polarization rotation by $$\frac{n}{2}\pi,$$

wherein the value of n is "0" or "1" respectively.

Preferably, the wavelength routing device is a wavelength division multiplexer, an arrayed-waveguide grating, a Bragg grating or a wavelength selective switch.

Preferably, the multi-wavelength laser generation device comprises a multi-wavelength pulse laser device and a wavelength selector, the multi-wavelength pulse laser device generates coherent multi-wavelength pulse lasers capable of meeting the requirement for simultaneous communication of the plurality of Bob terminals, and then, each Bob terminal with the corresponding wavelength selects the pulse laser with the corresponding wavelength using the wavelength selector.

Preferably, the wavelength selector selects wavelength in a secondary equidifferent frequency spacing mode.

Preferably, the first photon detector, the second photon detector, the third photon detector and the fourth photon detector make responses according to the phase difference of the pulses, namely when the phase difference of two continuous pulses is 0, the first detector makes a response, the measuring result is "00", the second detector makes a response, and the measuring result is "01"; and when the phase difference of the two continuous pulses is $\pi$, the third detector makes a response, the measuring result is "10", the fourth detector makes a response, and the measuring result is "11".

Preferably, each Bob terminal is referred as to Bobn, wherein n is a non-zero natural number.

A method applied to the phase and polarization multi-degree-of-freedom modulated QKD network system comprises the following steps:

S1. hardware configuration initialization, namely checking software and hardware facilities of the Alice terminal and each Bob terminal, determining whether equipment is able to work well, and setting an accurate working voltage and an appropriate working temperature;

S2. system noise testing, namely testing the system noise level on the premise that the Alice terminal does not transmit the pulse train, namely the number of the pulse train is zero;

S3. optical fiber length testing and pulse delay setting, namely transmitting a group of pulses by the Alice terminal, determining the length of an optical fiber in a link by measuring the arrival time of the pulses by each Bob terminal, presetting the length of the optical fiber of each Bob terminal according to the length relationship between each Bob terminal and the Alice terminal, and setting the delay between the upper arm path and the lower arm path of each Bob terminal;

S4. wavelength addressing, namely selecting a wavelength pulse suitable for each Bob terminal according to a wavelength allocation plan by the wavelength selector, and allocating pulsed light with different wavelengths into the corresponding Bob terminals to perform one-to-many network communication;

S5. key transmission, namely generating a pulse with a period being larger than the delay T by the multi-wavelength pulse generation device; attenuating the pulse to a single-photon level by the attenuator, then, entering the upper arm path and the lower arm path respectively through the first polarization beam splitter to form two pulses with delays T, arriving at the first beam combiner for beam combination, then, sequentially carrying out phase and polarization modulation by the phase modulator, the first polarization modulator and the second polarization modulator to make the pulses be transmitted in the same polarization state, and finally, carrying out polarization demodulation and phase demodulation by each Bob terminal; and S6. key sifting and code generation, namely recording the responses of the detectors and the response times of the first photon detector, the second photon detector, the third photon detector and the fourth photon detector by each Bob terminal, transmitting the response times of the first photon detector, the second photon detector, the third photon detector and the fourth photon detector to the Alice terminal, and retaining the corresponding key strings according to data transmitted by each Bob terminal and discarding the rest key strings by the Alice terminal.

Preferably, key sharing exists among the Bob terminals:

when the safe key priority is that Bobi>Bobj, Bobj shares a key of Bobi, the Alice terminal is used as an intermediate node, firstly, the Alice terminal and the key of Bobi are encrypted using the Alice terminal and a key of Bobj, then, the encrypted key of Bobi is transmitted to Bobj, and Bobj decrypts a cryptograph after receiving the cryptograph to obtain the key of Bobi so as to share the key with Bobi; and key sharing among the Bob terminals has exclusiveness, namely a key of a certain Bob terminal may be only used by one Bob terminal, and can't be used by other Bob terminals after being used by a particular one.

The present invention has the beneficial effects: 1. the phase and polarization multi-degree-of-freedom modulated QKD network system and the key distribution method are adopted so as to realize one-to-many quantum key sharing and effectively increase the information transmission capacity and are suitable for a phase and polarization multi-degree-of-freedom modulated QKD scheme and other QKD schemes.

2. Due to the adoption of a phase and polarization combined modulation method, two information bits are transferred by transferring one photon, the utilization ratio of the photon is increased from 0.5 to 2; and compared with an prior art, the scheme is capable of reducing the number of used devices, simplifying the structure, improving the information continuity and effectiveness and increasing the key generation rate.

3. Compared with the prior art of waiting for measurement at 12 time slots during each communication, the scheme that four electronic detectors are adopted to wait for measurement at 8 time slots during each communication has the advantages that the bit error rate caused by dark counting of the detectors is reduced by 33.3%, and the system is more efficient and stable. A classical DPS quantum key distribution mode is adopted, and each of phase differences of coherent pulses on two branches with an encoding interval T (namely delay T which is on a picosecond magnitude) is used as one phase encoding, so that photon-number-splitting attack and sequential attack may be effectively defended, and the efficiency of an eavesdropper Eve may be reduced.

BRIEF DESCRIPTION OF THE DRAWINGS

Names and Corresponding Symbols of All Parts in Figures are listed as follows: common optical fiber—101, wavelength routing device—102, special optical fibers—103, 104, 105.

multi-wavelength laser generation device—201, attenuator—202, first polarization beam splitter—203, first beam combiner—204, phase modulator—205, first polarization controller—206, second polarization controller—207; and second polarization beam splitter—301, third polarization controller—302, fourth polarization controller—307, third polarization beam splitter—303, fourth polarization beam splitter—308, second beam combiner—304, third beam combiner—309, first photon detector—305, second photon detector—306, third photon detector—310, fourth photon detector—311.

DETAILED DESCRIPTION

The accompanying drawings are only intended for exemplary explanation without limitation to the scope of the patent; and The technical solution of the present invention is further explained below in conjunction with the accompanying drawings and embodiments thereof.

The invention is of a point-to-multipoint networking mode which may be particularly further expanded to a multipoint-to-multipoint mode. The described embodiment is relevant to only one of one-to-many modes, apparently, the mode may be relatively easily expanded to more applications, and a schematic diagram of a relatively representative wavelength division multiplexing quantum key distribution network is shown as FIG. 1.

As shown in FIG. 1-FIG. 4, a phase and polarization multi-degree-of-freedom modulated QKD network system comprises an Alice control terminal, a wavelength division multiplexing unit and a plurality of Bob terminals, and the Alice terminal is connected with the plurality of Bob terminals by the wavelength division multiplexing unit.

Figure 1:
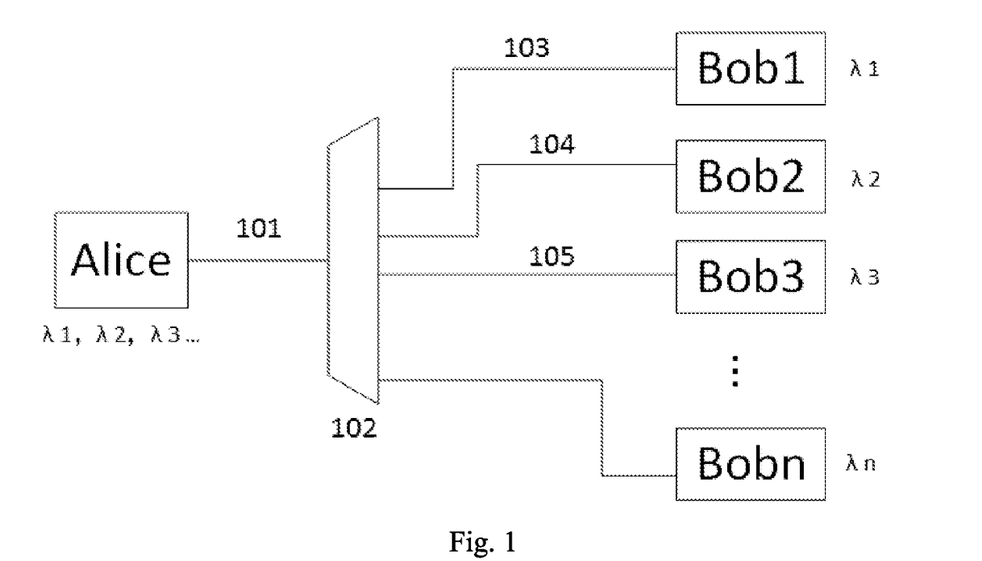
FIG. 1 is a structural block diagram of a wavelength division multiplexing unit and a plurality of Bob terminals of the present invention.
Figure 2:
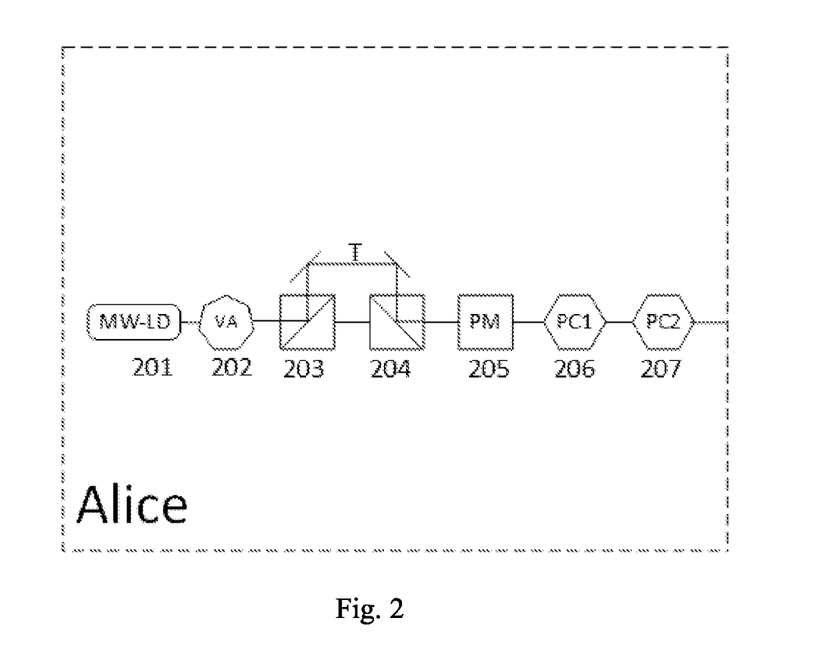
FIG. 2 is a structural block diagram of phase modulation and polarization modulation of an Alice terminal of the present invention.
Figure 3:
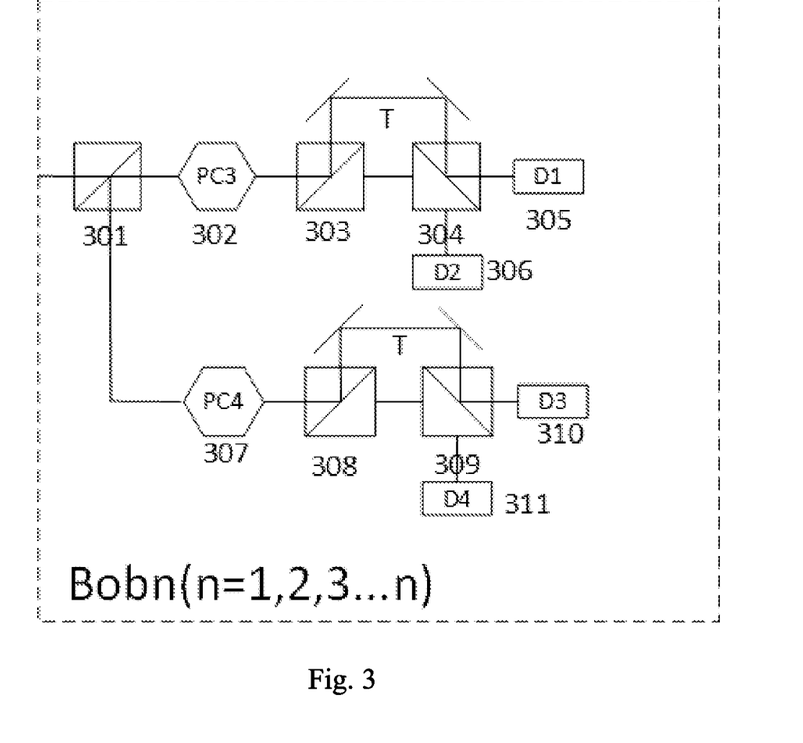
FIG. 3 is a structural block diagram of polarization demodulation and phase demodulation of a Bob terminal of the present invention.

The Alice terminal comprises a multi-wavelength laser generation device 201, an attenuator 202, a first polarization beam splitter 203, a first beam combiner 204, a phase modulator 205, a first polarization controller 206 and a second polarization controller 207;

the wavelength division multiplexing unit comprises a wavelength selection device;

the plurality of Bob terminals comprises a plurality of Bob terminals for receiving a plurality of photons of different wavelengths respectively, each Bob terminal comprises a second polarization beam splitter 301, a third polarization controller 302, a fourth polarization controller 307, a third polarization beam splitter 303, a fourth polarization beam splitter 308, a second beam combiner 304, a third beam combiner 309, a first photon detector 305, a second photon detector 306, a third photon detector 310 and a fourth photon detector 311;

the working process of the system is as follows:

pulse train with a plurality of wavelengths are generated by the multi-wavelength laser generation device and is then attenuated by the attenuator 202 to form a single-photon pulse, a single-photon pulse is split by the first polarization beam splitter 203 into a vertically-polarized pulse and a horizontally-polarized pulse, and the vertically-polarized pulse and the horizontally-polarized pulse enter the first beam combiner 204 through an upper arm path and a lower arm path respectively so as to be subjected to beam combination; and then, the pulses are randomly modulated for $k\pi$ (k=0, 1) phases by the phase modulator 205 to arrive at the first polarization controller 206 and the second polarization controller 207 respectively so as to be subjected to polarization rotation, and finally, the two pulses enter the Bob terminal in the same polarization state;

multi-wavelength laser pulses with the same polarization are transmitted to a wavelength routing device 102, the Bob terminal with a corresponding wavelength is selected according to a wavelength addressing mode, polarization demodulation is performed by the second polarization beam splitter 301 of the Bob terminal, and the horizontally-polarized pulse is selected to pass through the third polarization controller 302 when a polarization bit is "0"; and the vertically-polarized pulse is selected to pass through the fourth polarization controller 307 when the polarization bit is "1";

after the pulse is output from the third polarization controller and passes through the third polarization beam splitter 303, two paths including an upper arm path and a lower arm path are formed, wherein the upper arm path is the one through which a prepulse is delayed to arrive at the second beam combiner 304; and the lower arm path is the one through which an afterpulse directly arrives at the second beam combiner 304, two beams of light on the upper arm path and the lower arm path generate interference at the second beam combiner 304, and then, the first photon detector 305 and the second photon detector 306 make identification responses according to a randomly-modulated phase difference; and after the pulse is output from the fourth polarization controller 307 and passes through the fourth polarization beam splitter 308, two paths including an upper arm path and a lower arm path are formed, wherein the upper arm path is the one through which a prepulse is delayed to arrive at the third beam combiner 309; and the lower arm path is the one through which an afterpulse directly arrives at the third beam combiner 309, two beams of light on the upper arm path and the lower arm path generate interference at the third beam combiner 309, and then, the third photon detector 310 and the fourth photon detector 311 make identification responses according to a randomly-modulated phase difference.

The technical solution of the present invention is further explained below in combination with the accompanying drawings and embodiments.

The invention is a point-to-multipoint networking mode which particularly may be further expanded to a multipoint-to-multipoint mode. The described embodiment is of only one of one-to-many modes, apparently, the mode may be relatively easily expanded to more applications, and a schematic diagram of a relatively representative wavelength division multiplexing quantum key distribution network is shown as FIG. 1.

In FIG. 1, as a pulse signal transmitting terminal, the Alice terminal owns a multi-wavelength light source and may generate pulse signals having different wavebands and capable of meeting the requirement for simultaneous communication of the plurality of Bob terminals. Each Bob terminal may be allocated into a signal with a certain wavelength and has relatively wide applicability for the wavelength of a pulse, namely each Bob terminal may still work well after the allocation of the wavelengths of signals among all the Bob terminals is regulated in a wavelength planning process. A common optical fiber in FIG. 1 is shared by all users, each of optical fibers 103, 104 and 105 is a special optical fiber for each user, and the sum of the special optical fiber and the common optical fiber 101 of each user is defined as the distance of each user. The wavelength routing device 102 is used between the Alice control terminal and the Bob terminal to control the path choice of the pulse signal with each wavelength.

FIG. 2 is a schematic diagram of an embodiment of the Alice terminal in the phase and polarization multi-degree-of-freedom modulated QKD network system and method. The Alice terminal of the system is used for phase modulation and polarization modulation of a single photon.

The modulation process is described in detail as below:

45-DEG pump light with a polarization state being $$\left|\pi/4\right> = \frac{1}{\sqrt{2}}(|H> + |V>)$$

is attenuated to form a single-photon pulse $F(x,t)|\pi/4>$, wherein $F(x,t)=f(kx-\omega t)=\alpha e^{-\beta(kx-\omega t)^2}$ is a gaussian pulse. The single-photon pulse is split into two paths of pulses by the first polarization beam splitter 203, and the two paths of pulses have a delay T. After the two pulses with the delay T pass through the phase modulator PM ($\theta_i=k\pi$, the value of k is "0" or "1"), pulse modes are changed into $F(x,t)e^{i\theta_1}|H\rangle$ and $F(x,t+T) e^{i\theta_2}|V\rangle$ respectively. A delayed pulse is subjected to polarization rotation by $\varphi_1$ by the first polarization controller (PC1) 206, $$\varphi_1 = \frac{n-1}{2}\pi,$$

and at the moment, the pulse is $$F(x, t+T)e^{i\theta_2}\left|\frac{n-1}{2}\pi\right\rangle;$$

and a short-circuit pulse is subjected to polarization rotation by $$\varphi_2 = \frac{n}{2}\pi$$

by the second polarization controller (PC2) 207, at the moment, the pulse is $$F(x, t)e^{i\theta_1}\left|\frac{n}{2}\pi\right\rangle,$$

and the value of n is "0" or "1".

The multi-wavelength laser generation device 201 generates pulse train with a plurality of wavelengths (λ1, λ2, λ3 . . . λn) respectively, wherein the generated multi-wavelength pulse laser is polarized for 45 DEG, the period of the pulse is larger than the delay T, and the pulse train are attenuated by the attenuator 202 to form a single-photon pulse; the single-photon pulse is split into a horizontally-polarized pulse and a vertically-polarized pulse by the first polarization beam splitter 203, and the vertically-polarized pulse and the horizontally-polarized pulse enter the first beam combiner through an upper arm path and a lower arm path respectively, wherein the pulse on the upper arm path has a delay T compared with the pulse on the lower arm path. Then, the two pulses pass through the phase modulator 205 by which the two pulses are randomly modulated for kπ phases (the value of k is 0 or 1). When the two pulses simultaneously arrive at the first polarization controller 206 and the second polarization controller 207 (namely the delay T is generated between the two polarization controllers), the first polarization controller 206 performs pulse polarization rotation by $$\frac{n-1}{2}\pi,$$

and the second polarization controller 207 performs pulse polarization rotation by $$\frac{n}{2}\pi,$$

wherein the value of n is "0" or "1" respectively. At the moment, the two pulses are transmitted by the optical fibers to enter the Bob terminal in the same polarization state.

FIG. 3 is a schematic diagram of an embodiment of the Bob terminal in the phase and polarization multi-degree-of-freedom modulated QKD network system and method. Taking Bob1 as an example, a Bob1 terminal is subjected to phase modulation and polarization modulation.

The demodulation process is described in detail as below:
When n is equal to 0, two pulsed lights pass through the third polarization controller PC3, and the pulse modes are changed into $F(x, t)e^{i\theta_1}|V\rangle$ and $F(x, t+T)e^{i\theta_2}|H\rangle$. At the moment, vertically-polarized light is changed into $F(x, t+T)e^{i\theta_1}|V\rangle$ after a delay T. The pulses $F(x, t+T)e^{i\theta_1}|V\rangle$ and $F(x, t+T)e^{i\theta_2}|H\rangle$ are subjected to beam combination.

At that time, the corresponding key is "00" when the first photon detector D1 responds; and at that time, the corresponding key is "01" when the first photon detector D2 responds.

In the same way, when n is equal to 1, the corresponding key is "10" if the third photon detector D3 responds; and the corresponding key is "11" if the fourth photon detector responds.

When n is "0", two pulses with a time interval T enter the third polarization controller 302 in a horizontal polarization state through the second polarization beam splitter 301; and when n is "1", the two pulses with the time interval T enter the polarization controller 307 in a vertical polarization state through the second polarization beam splitter 301. Fast-axis pulse polarization is only rotated by $$\frac{\pi}{2}$$

by the third polarization controller 302 so as to be changed into vertical polarization; the vertically-polarized pulse is reflected by the third polarization beam splitter 303 and then enters the second beam combiner 304 after a delay T; and the horizontally-polarized pulse is directly transmitted by the third polarization beam splitter 303 to enter the second beam combiner 304. Slow-axis pulse polarization is only rotated by $$\frac{\pi}{2}$$

by the fourth polarization controller 307 so as to be changed into horizontal polarization; the horizontally-polarized pulse is directly transmitted by the fourth polarization beam splitter 308 to enter the third beam combiner 309; and the vertically-polarized pulse is reflected by the fourth polarization beam splitter 308 and then enters the third beam combiner 309 after a delay T. Two pulsed lights meeting at the second beam combiner 304 generate interference, the first photon detector 305 or the second photon detector 306 makes a response according to a randomly-modulated phase difference 0 or π. In the same way, two pulsed lights meeting at the third beam combiner 309 generate interference, and the third photon detector 310 or the fourth photon detector 311 makes a response according to a randomly-modulated phase difference 0 or π.

Figure 4:
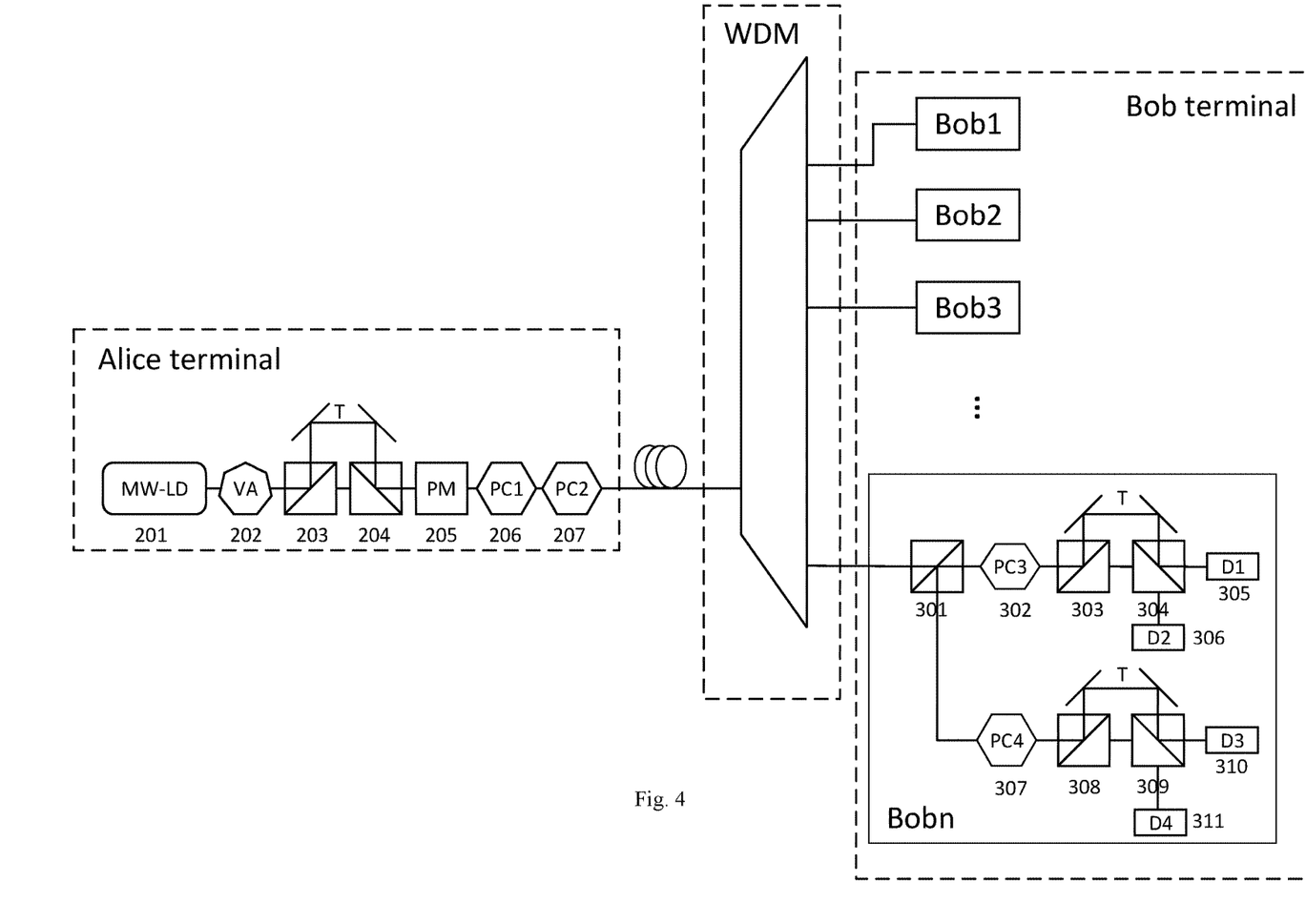
FIG. 4 is a block diagram showing working principle of the present invention.

FIG. 4 is a working principle block diagram of the phase and polarization multi-degree-of-freedom modulated QKD network system and method. The phase and polarization multi-degree-of-freedom modulated QKD network system comprises a Alice control terminal, a wavelength division multiplexing unit and a plurality of Bob terminals, and the Alice terminal is connected with the Bob terminal by the wavelength division multiplexing unit, wherein the Alice terminal performs phase modulation and polarization modulation on a single photon respectively and the single photon enters the Bob terminal through a quantum channel to be subjected to polarization demodulation and phase demodulation. The specific modulation and demodulation processes have been described in detail in FIG. 2 and FIG. 3, and the descriptions thereof are omitted herein.

Figure 5:
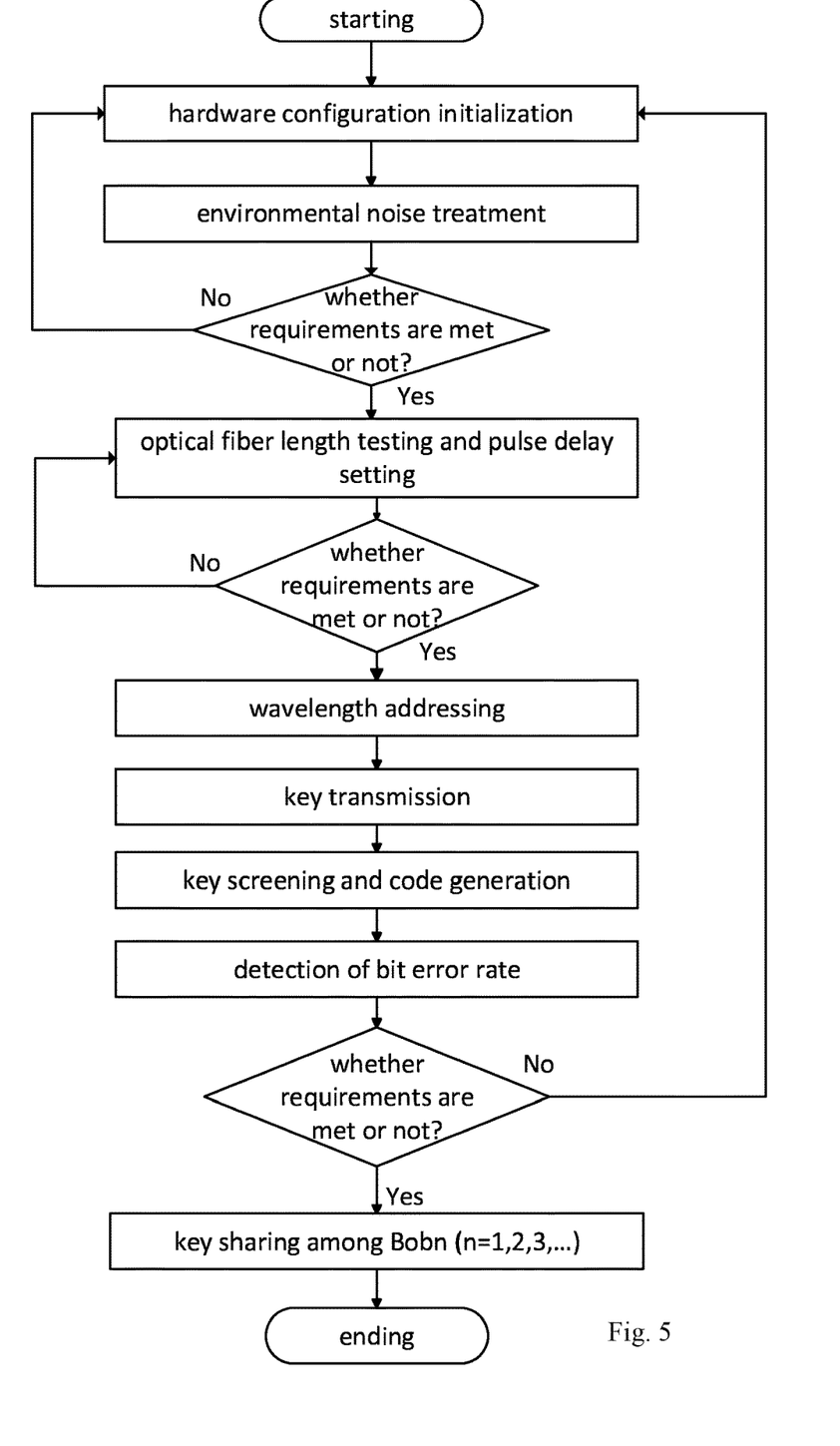
FIG. 5 is a work flow diagram of the present invention.

FIG. 5 is a key distribution method applied to the phase and polarization multi-degree-of-freedom modulated QKD network system, and the key distribution method comprises the following steps:

S1. hardware configuration initialization, namely checking software and hardware facilities of the Alice terminal and each Bob terminal, determining whether equipment is able to work well, and setting an accurate working voltage and an appropriate working temperature;

S2. system noise testing, namely testing the system noise level on the premise that the Alice terminal does not transmit the pulse train, namely the number of the pulse train is zero;

S3. optical fiber length testing and pulse delay setting, namely transmitting a group of pulses by the Alice terminal, determining the length of an optical fiber in a link by measuring the arrival time of the pulses by each Bob terminal, presetting the length of the optical fiber of each Bob terminal according to the length relationship between each Bob terminal and the Alice terminal, and setting the delay between the upper arm path and the lower arm path of each Bob terminal;

S4. wavelength addressing, namely selecting a wavelength pulse suitable for each Bob terminal according to a wavelength allocation plan by the wavelength selector, and allocating pulsed light with different wavelengths into the corresponding Bob terminals to perform one-to-many network communication;

S5. key transmission, namely generating a pulse with a period being larger than the delay T by the multi-wavelength pulse generation device; attenuating the pulse to a single-photon level by the attenuator, then, entering the upper arm path and the lower arm path respectively through the first polarization beam splitter to form two pulses with delays T, arriving at the first beam combiner for beam combination, then, sequentially carrying out phase and polarization modulation by the phase modulator, the first polarization modulator and the second polarization modulator to make the pulses be transmitted in the same polarization state, and finally, carrying out polarization demodulation and phase demodulation by each Bob terminal; and S6. key sifting and code generation, namely recording the responses of the detectors and the response times of the first photon detector, the second photon detector, the third photon detector and the fourth photon detector by each Bob terminal, transmitting the response times of the first photon detector, the second photon detector, the third photon detector and the fourth photon detector to the Alice terminal, and retaining the corresponding key strings according to data transmitted by each Bob terminal and discarding the rest key strings by the Alice terminal.

Key sharing exists among the Bob terminals:

when the safe key priority is that Bobi>Bobj, Bobj shares a key of Bobi, the Alice terminal is used as an intermediate node, firstly, the Alice terminal and the key of Bobi are encrypted using the Alice terminal and a key of Bobj, then, the encrypted key of Bobi is transmitted to Bobj, and Bobj decrypts a cryptograph after receiving the cryptograph to obtain the key of Bobi so as to share the key with Bobi; and key sharing among the Bob terminals has exclusiveness, namely a key of a certain Bob terminal may be only used by one Bob terminal and can't be used by other Bob terminals after being used by a particular one.

The present invention has the beneficial effects: 1. the phase and polarization multi-degree-of-freedom modulated QKD network system and the key distribution method are adopted so as to realize one-to-many quantum key sharing and effectively increase the information transmission capacity and are suitable for a phase and polarization multi-degree-of-freedom modulated QKD scheme and other QKD schemes.

2. Due to the adoption of a phase and polarization combined modulation method, two information bits are transferred by transferring one photon, the utilization ratio of the photon is increased from 0.5 to 2; and compared with prior art, the scheme is capable of reducing the number of used devices, simplifying the structure, improving the information continuity and effectiveness and increasing the key generation rate.

3. Compared with the prior art of waiting for measurement at 12 time slots during each communication, the scheme that four electronic detectors are adopted to wait for measurement at 8 time slots during each communication has the advantages that the bit error rate caused by dark counting of the detectors is reduced by 33.3%, and the system is more efficient and stable. A classical DPS quantum key distribution mode is adopted, and each of phase differences of coherent pulses on two branches with an encoding interval T (namely delay T which is on a picosecond magnitude) is used as one phase code, so that photon-number-splitting attack and sequential attack may be effectively defended, and the efficiency of an eavesdropper Eve may be reduced.

The positional relation described in the accompanying drawings is only intended for exemplary explanation, and may not be interpreted as limitation to the patent.

Obviously, the embodiments of the present invention are only intended to clearly explain examples thereof, but are not intended to limit an implementation way of the present invention. Other variations and changes in different modes may also be made by the ordinary skilled in the art on the basis of the description. Exhaustive illustration of all implementation ways is not needed and may not be realized herein. Any modifications, equivalent replacements, improvements and the like within the spirit and principle of the present invention should fall into the scope of protection of the claims of the present invention.

What is claimed is:

1. A phase and polarization multi-degree-of-freedom modulated QKD network system, comprising an Alice control terminal, a wavelength division multiplexing unit and a plurality of Bob terminals for receiving a plurality of photons of different wavelengths, the Alice terminal being connected with the plurality of Bob terminals by the wavelength division multiplexing unit, wherein the Alice terminal comprises a multi-wavelength laser generation device, an attenuator, a first polarization beam splitter, a first beam combiner, a phase modulator, a first polarization controller and a second polarization controller;

the wavelength division multiplexing unit comprises a wavelength selection device;

each Bob terminal comprises a second polarization beam splitter, a third polarization controller, a fourth polarization controller, a third polarization beam splitter, a fourth polarization beam splitter, a second beam combiner, a third beam combiner, a first photon detector, a second photon detector, a third photon detector and a fourth photon detector;

a pulse train with a plurality of wavelengths are generated by the multi-wavelength laser generation device and is then attenuated by the attenuator to form a single-photon pulse, the single-photon pulse is split into a vertically-polarized pulse and a horizontally-polarized pulse by the first polarization beam splitter, and the vertically-polarized pulse and the horizontally-polarized pulse enter the first beam combiner through an upper arm path and a lower arm path respectively so as to be subjected to beam combination; and then, the pulses are randomly modulated for $k\pi$ ($k=0, 1$) phases by the phase modulator to arrive at the first polarization controller and the second polarization controller respectively so as to be subjected to polarization rotation, and finally, the two pulses enter a corresponding Bob terminal in the same polarization state;

multi-wavelength laser pulses with the same polarization are transmitted to a wavelength routing device, the each Bob terminal with a corresponding wavelength is selected according to a wavelength addressing mode, polarization demodulation is performed by the second polarization beam splitter of the Bob terminal, and the horizontally-polarized pulse is selected to pass through the third polarization controller when a polarization bit is "0"; and the vertically-polarized pulse is selected to pass through the fourth polarization controller when the polarization bit is "1";

after the pulse is output from the third polarization controller and passes through the third polarization beam splitter, two paths including an upper arm path and a lower arm path are formed, wherein the upper arm path is the one through which a prepulse is delayed to arrive at the second beam combiner; and the lower arm path is the one through which an afterpulse directly arrives at the second beam combiner, two beams of light on the upper arm path and the lower arm path generate interference at the second beam combiner, and then, the first photon detector and the second photon detector make identification responses according to a randomly-modulated phase difference; and after the pulse is output from the fourth polarization controller and passes through the fourth polarization beam splitter, two paths including an upper arm path and a lower arm path are formed, wherein the upper arm path is the one through which a prepulse is delayed to arrive at the third beam combiner; and the lower arm path is the one through which an afterpulse directly arrives at the third beam combiner, two beams of light on the upper arm path and the lower arm path generate interference at the third beam combiner, and then, the third photon detector and the fourth photon detector make identification responses according to a randomly-modulated phase difference.

2. The phase and polarization multi-degree-of-freedom modulated QKD network system of claim 1, characterized in that the upper arm path has a delay T compared with the lower arm path.

3. The phase and polarization multi-degree-of-freedom modulated QKD network system of claim 1, characterized in that the first polarization controller performs pulse polarization rotation by $$\frac{n-1}{2}\pi,$$

and the second polarization controller performs pulse polarization rotation by $$\frac{n}{2}\pi,$$

wherein the value of n is "0" or "1" respectively.

4. The phase and polarization multi-degree-of-freedom modulated QKD network system of claim 1, characterized in that the wavelength routing device is a wavelength division multiplexer, an arrayed-waveguide grating, a Bragg grating or a wavelength selective switch.

5. The phase and polarization multi-degree-of-freedom modulated QKD network system of claim 1, characterized in that the multi-wavelength laser generation device comprises a multi-wavelength pulse laser device and a wavelength selector, the multi-wavelength pulse laser device generates coherent multi-wavelength pulse lasers capable of meeting the requirement for simultaneous communication of the plurality of Bob terminals, and then, each Bob terminal selects the pulse laser with the corresponding wavelength using the wavelength selector.

6. The phase and polarization multi-degree-of-freedom modulated QKD network system of claim 5, characterized in that the wavelength selector selects wavelength in a secondary equidifferent frequency spacing mode.

7. The phase and polarization multi-degree-of-freedom modulated QKD network system of claim 1, characterized in that the first photon detector, the second photon detector, the third photon detector and the fourth photon detector make responses according to the phase difference of the pulses, namely when the phase difference of two continuous pulses is 0, the first detector makes a response, the measuring result is "00", the second detector makes a response, and the measuring result is "01"; and when the phase difference of the two continuous pulses is π, the third detector makes a response, the measuring result is "10", the fourth detector makes a response, and the measuring result is "11".

8. The phase and polarization multi-degree-of-freedom modulated QKD network system of claim 1, characterized in that each Bob terminal is referred as to Bobn, wherein n is a non-zero natural number.

9. A phase and polarization multi-degree-of-freedom modulated QKD method realized by the phase and polarization multi-degree-of-freedom modulated QKD network system of claim 1, comprising the following steps:

S1. hardware configuration initialization, namely checking software and hardware facilities of the Alice terminal and each Bob terminal, determining whether equipment is able to work well, and setting an accurate working voltage and an appropriate working temperature;

S2. system noise testing, namely testing the system noise level on the premise that the Alice terminal does not transmit the pulse train, namely the number of the pulse train is zero;

S3. optical fiber length testing and pulse delay setting, namely transmitting a group of pulses by the Alice terminal, determining the length of an optical fiber in a link by measuring the arrival time of the pulses by each Bob terminal, presetting the length of the optical fiber of each Bob terminal according to the length relationship between each Bob terminal and the Alice terminal, and setting the delay between the upper arm path and the lower arm path of each Bob terminal;

S4. wavelength addressing, namely selecting a wavelength pulse suitable for each Bob terminal according to a wavelength allocation plan by the wavelength selector, and allocating pulsed light with different wavelengths into the corresponding Bob terminals to perform one-to-many network communication;

S5. key transmission, namely generating a pulse with a period being larger than the delay T by the multi-wavelength pulse generation device; attenuating the pulse to a single-photon level by the attenuator, then, entering the upper arm path and the lower arm path respectively through the first polarization beam splitter to form two pulses with delays T, arriving at the first beam combiner for beam combination, then, sequentially carrying out phase and polarization modulation by the phase modulator, the first polarization modulator and the second polarization modulator to make the pulses be transmitted in the same polarization state, and finally, carrying out polarization demodulation and phase demodulation by each Bob terminal; and S6. key sifting and code generation, namely recording the responses of the detectors and the response times of the first photon detector, the second photon detector, the third photon detector and the fourth photon detector by each Bob terminal, transmitting the response times of the first photon detector, the second photon detector, the third photon detector and the fourth photon detector to the Alice terminal, and retaining the corresponding key strings according to data transmitted by each Bob terminal and discarding the rest key strings by the Alice terminal.

10. The phase and polarization multi-degree-of-freedom modulated QKD method of claim 9, characterized in that key sharing exists among the Bob terminals:
when the safe key priority is that Bobi>Bobj, Bobj shares a key of Bobi, the Alice terminal is used as an intermediate node, firstly, the Alice terminal and the key of Bobi are encrypted using the Alice terminal and a key of Bobj, then, the encrypted key of Bobi is transmitted to Bobj, and Bobj decrypts a cryptograph after receiving the cryptograph to obtain the key of Bobi so as to share the key with Bobi; and
key sharing among the Bob terminals has exclusiveness, namely a key of a certain Bob terminal may be only used by one Bob terminal, Bob terminal and can't be used by other Bob terminals after being used by a particular one.

11. The phase and polarization multi-degree-of-freedom modulated QKD method of claim 9, characterized in that the upper arm path has a delay T compared with the lower arm path.

12. The phase and polarization multi-degree-of-freedom modulated QKD method of claim 9, characterized in that the first polarization controller performs pulse polarization rotation by $$\frac{n-1}{2}\pi,$$

and the second polarization controller performs pulse polarization rotation by $$\frac{n}{2}\pi,$$

wherein the value of n is "0" or "1" respectively.

13. The phase and polarization multi-degree-of-freedom modulated QKD method of claim 9, characterized in that the wavelength routing device is a wavelength division multiplexer, an arrayed-waveguide grating, a Bragg grating or a wavelength selective switch.

14. The phase and polarization multi-degree-of-freedom modulated QKD method of claim 9, characterized in that the multi-wavelength laser generation device comprises a multi-wavelength pulse laser device and a wavelength selector, the multi-wavelength pulse laser device generates coherent multi-wavelength pulse lasers capable of meeting the requirement for simultaneous communication of the plurality of Bob terminals, and then, each Bob terminal selects the pulse laser with the corresponding wavelength using the wavelength selector.

15. The phase and polarization multi-degree-of-freedom modulated QKD method of claim 14, characterized in that the wavelength selector selects wavelength in a secondary equidifferent frequency spacing mode.

16. The phase and polarization multi-degree-of-freedom modulated QKD method of claim 9, characterized in that the first photon detector, the second photon detector, the third photon detector and the fourth photon detector make responses according to the phase difference of the pulses, namely when the phase difference of two continuous pulses is 0, the first detector makes a response, the measuring result is "00", the second detector makes a response, and the measuring result is "01"; and when the phase difference of the two continuous pulses is π, the third detector makes a response, the measuring result is "10", the fourth detector makes a response, and the measuring result is "11".

17. The phase and polarization multi-degree-of-freedom modulated QKD method of claim 9, characterized in that each Bob terminal is referred as to Bobn, wherein n is a non-zero natural number.

* * * * *